US012176801B2

(12) United States Patent
Tian et al.

(10) Patent No.: US 12,176,801 B2
(45) Date of Patent: Dec. 24, 2024

(54) POWER SOURCE PROVIDING APPARATUS, AND CHARGING METHOD AND SYSTEM

(71) Applicants: GUANGDONG OPPO MOBILE TELECOMMUNICATIONS CORP., LTD., Guangdong (CN); POWERLAND TECHNOLOGY INC., Jiangsu (CN)

(72) Inventors: Chen Tian, Guangdong (CN); Jingpeng Zhu, Jiangsu (CN); Jialiang Zhang, Guangdong (CN); Ming Xu, Jiangsu (CN)

(73) Assignees: GUANGDONG OPPO MOBILE TELECOMMUNICATIONS CORP., LTD., Guangdong (CN); POWERLAND TECHNOLOGY INC., Jiangsu (CN)

(*) Notice: Subject to any disclaimer, the term of this patent is extended or adjusted under 35 U.S.C. 154(b) by 224 days.

(21) Appl. No.: 18/148,081

(22) Filed: Dec. 29, 2022

(65) Prior Publication Data

US 2023/0198371 A1 Jun. 22, 2023

Related U.S. Application Data

(63) Continuation of application No. PCT/CN2021/108745, filed on Jul. 27, 2021.

(30) Foreign Application Priority Data

Sep. 30, 2020 (CN) .................. 202011063504.X

(51) Int. Cl.
H02M 1/00 (2007.01)
H02J 7/00 (2006.01)
(Continued)

(52) U.S. Cl.
CPC ....... *H02M 1/0067* (2021.05); *H02J 7/00711* (2020.01); *H02J 7/00712* (2020.01);
(Continued)

(58) Field of Classification Search
CPC .... H02M 1/0067; H02M 3/01; H02J 7/00711; H02J 7/00712
See application file for complete search history.

(56) References Cited

U.S. PATENT DOCUMENTS

2004/0156217 A1   8/2004   Phadke
2012/0163052 A1*  6/2012   Yonezawa ........... H02M 1/4225
                                                  363/126
(Continued)

FOREIGN PATENT DOCUMENTS

CN   1205807 A   1/1999
CN   2870378 Y   2/2007
(Continued)

OTHER PUBLICATIONS

WIPO, International Search Report for PCT Application No. PCT/CN2021/108745, Oct. 26, 2021.
(Continued)

*Primary Examiner* — Adolf D Berhane
*Assistant Examiner* — Afework S Demisse
(74) *Attorney, Agent, or Firm* — Hodgson Russ LLP

(57) ABSTRACT

A power supply device, includes a rectifier circuit configured to perform rectification on alternating-current power to obtain a first pulsating direct-current voltage, a first-stage conversion circuit connected to the rectifier circuit and configured to perform isolation conversion on the first pulsating direct-current voltage to thereby obtain a second pulsating direct-current voltage; a second-stage conversion circuit connected to the first-stage conversion circuit and configured to convert the second pulsating direct-current
(Continued)

voltage into a stable direct-current voltage; and a valley-fill circuit connected to the rectifier circuit and the first-stage conversion circuit individually, wherein the valley-fill circuit is configured to supply, in response to a voltage value of the first pulsating direct-current being less than a first voltage threshold, electrical power to an input of the first-stage conversion circuit to thereby increase a valley voltage of the first pulsating direct-current voltage.

20 Claims, 7 Drawing Sheets

(51) Int. Cl.
    *H02J 7/02*     (2016.01)
    *H02M 3/00*     (2006.01)
    *H02M 3/158*     (2006.01)
    *H02M 3/335*     (2006.01)

(52) U.S. Cl.
    CPC ............... *H02J 7/02* (2013.01); *H02M 3/01* (2021.05); *H02M 3/1582* (2013.01); *H02M 3/33573* (2021.05); *H02J 2207/20* (2020.01)

(56) References Cited

U.S. PATENT DOCUMENTS

| | | |
|---|---|---|
| 2016/0301316 A1 | 10/2016 | Nielsen |
| 2017/0271982 A1 | 9/2017 | Dicke et al. |
| 2018/0234022 A1* | 8/2018 | Ye .................. H02M 3/33576 |
| 2019/0252995 A1 | 8/2019 | Dai |
| 2020/0153178 A1 | 5/2020 | Zhang et al. |

FOREIGN PATENT DOCUMENTS

| | | |
|---|---|---|
| CN | 103618461 A | 3/2014 |
| CN | 105337514 A | 2/2016 |
| CN | 106793274 A | 5/2017 |
| CN | 107846136 | 3/2018 |
| CN | 208046444 U | 11/2018 |
| CN | 109599924 A | 4/2019 |
| CN | 111082651 A | 4/2020 |
| WO | 2019158120 A1 | 8/2019 |

OTHER PUBLICATIONS

CNIPA, First Office Action for CN Application No. 202011063504.X, Jul. 5, 2021.
CNIPA, Second Office Action for CN Application No. 202011063504.X, Jan. 13, 2022.
CNIPA, Decision of Rejection for CN Application No. 202011063504.X, Jul. 5, 2022.
EPO, Extended European Search Report for EP Application No. 21874006.6, Jan. 23, 2024.
CNIPA, Reexamination Decision for CN Application No. 202011063504.X, Jul. 19, 2023.
CNIPA, Notification of Reexamination for CN Application No. 202011063504.X, Mar. 23, 2023.

* cited by examiner

POWER SOURCE PROVIDING APPARATUS, AND CHARGING METHOD AND SYSTEM

CROSS REFERENCE TO RELATED APPLICATIONS

This application is a continuation of International Application No. PCT/CN2021/108745 filed on Jul. 27, 2021, which claims priority to Chinese Patent Application No. 202011063504.X, filed on Sep. 30, 2020. The entire disclosures of the above-mentioned applications are incorporated herein by reference.

TECHNICAL FIELD

The disclosure relates to the field of power conversion technology, and in particularly to a power supply device, a charging method, and a charging system.

BACKGROUND

With rapid development of electronic technology, electronic products in more and more forms appear on the market, and the electronic products have become an indispensable part of users' lives. Many electronic products on the market (such as mobile phones and wearable devices) need to be charged frequently to ensure their normal operations. At present, a device (such as an adapter) that can supply electrical power to the electronic product is usually bulky and inconvenient to carry. Therefore, how to reduce a volume of a power supply device has become an urgent problem to be solved.

SUMMARY

Embodiments of the disclosure disclose a power supply device, a charging method, and a charging system.

Embodiments of the disclosure discloses a power supply device, including:
a rectifier module configured to perform rectification on alternating-current power to thereby obtain a first pulsating direct-current voltage;
a first-stage conversion circuit connected to the rectifier module, in which the first-stage conversion circuit is configured to perform isolation conversion on the first pulsating direct-current voltage to thereby obtain a second pulsating direct-current voltage;
a second-stage conversion circuit connected to the first-stage conversion circuit, in which the second-stage conversion circuit is configured to convert the second pulsating direct-current voltage into a stable direct-current voltage; and
a valley-fill circuit connected to the rectifier module and the first-stage conversion circuit individually, in which the valley-fill circuit is configured to supply, in response to a voltage value of the first pulsating direct-current being less than a first voltage threshold, electrical power to an input of the first-stage conversion circuit to thereby increase a valley voltage of the first pulsating direct-current voltage.

The embodiments of the disclosure a charging method applied in a power supply device. The method includes:
performing rectification on a received alternating-current voltage to obtain a first pulsating direct-current voltage;
performing, by a first-stage conversion circuit, isolation conversion on the first pulsating direct-current voltage to thereby obtain a second pulsating direct-current voltage;
converting, by a second-stage conversion circuit, the second pulsating direct-current voltage into a stable direct-current voltage; and
supplying, by a valley-fill circuit, electrical power to increase a valley voltage of the first pulsating direct-current voltage, in response to a voltage value of the first pulsating direct-current being less than a first voltage threshold.

The embodiments of the disclosure disclose a charging system including the above power supply device and a terminal device. Specifically,
the power supply device further comprising an output interface, in which the output interface is connected to an output terminal of the second-stage conversion circuit of the power supply device;
the terminal device comprising a battery charging circuit; and
the battery charging circuit is configured to receive a stable direct-current voltage output by the output interface and load the stable direct-current voltage to a battery.

Details of one or more embodiments of the disclosure will be set forth in the drawings and description as follows. Other features and advantages of the disclosure will be presented from the description, the drawings and the claims.

BRIEF DESCRIPTION OF THE DRAWINGS

In order to more clearly illustrate technical solutions in embodiments of the disclosure, drawings used in the description of the embodiments will be briefly described below. Apparently, the drawings in the following description are merely some embodiments of the disclosure. For those skilled in the art, other drawings may also be obtained according to these drawings without paying any creative work.

DETAILED DESCRIPTION OF EMBODIMENTS

The technical solutions in the embodiments of the disclosure will be clearly and completely described below with reference to the drawings in the embodiments of the disclosure. Apparently, the described embodiments are merely some but not all of the embodiments of disclosure. Based on the embodiments of the disclosure, all other embodiments obtained by those of ordinary skill in the art without creative efforts shall fall within the protection scope of the disclosure.

It should be noted that, in the embodiments and drawings of the disclosure, the terms "include or comprise" and "have" as well as variations thereof are intended to cover non-exclusive inclusion. For example, a process, a system, a product, or a device including a series of operations or units is not limited to the listed operations or units, but optionally further includes other unlisted operations or units, or alternatively further includes other operations or units inherent to the process, the product, or the device.

It should be understood that the terms "first", "second", etc. in the disclosure may be used herein to describe various elements rather than limit these elements. These terms are only used to distinguish one element from another. For example, a first capacitance may be referred to as a second capacitance, and similarly, the second capacitance may be referred to as the first capacitance, without departing from the scope of the disclosure. Both the first capacitor and the second capacitor are capacitors, but they are not the same capacitor.

Figure 1A:
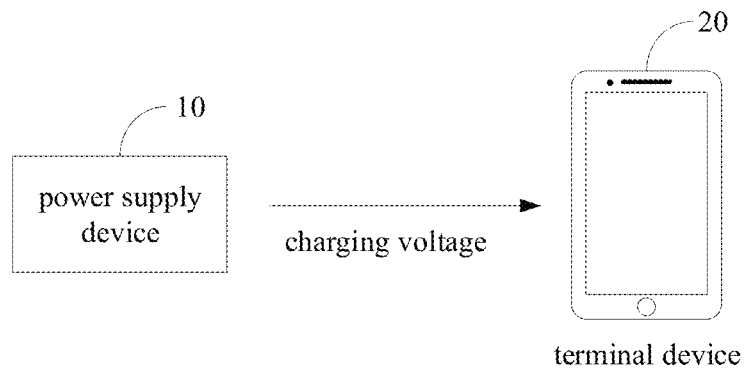
FIG. 1A is an application scenario diagram of a power supply device according to an embodiment of the disclosure.

FIG. 1A is an application scenario diagram of a power supply device according to an embodiment of the disclosure. As illustrated in FIG. 1A, a power supply device 10 may output a charging voltage meeting a charging requirement to a terminal device 20 to thereby charge the terminal device 20. In at least one alternative embodiment, the power supply device 10 may include, but is not limited to, an adapter, a mobile power supply, etc., and the terminal device 20 may include, but is not limited to, a mobile phone, a tablet computer, a wearable device, a notebook computer, a personal computer (PC), etc. The embodiments of the disclosure do not specifically limit product forms of the power supply device 10 and the terminal device 20.

Figure 1B:
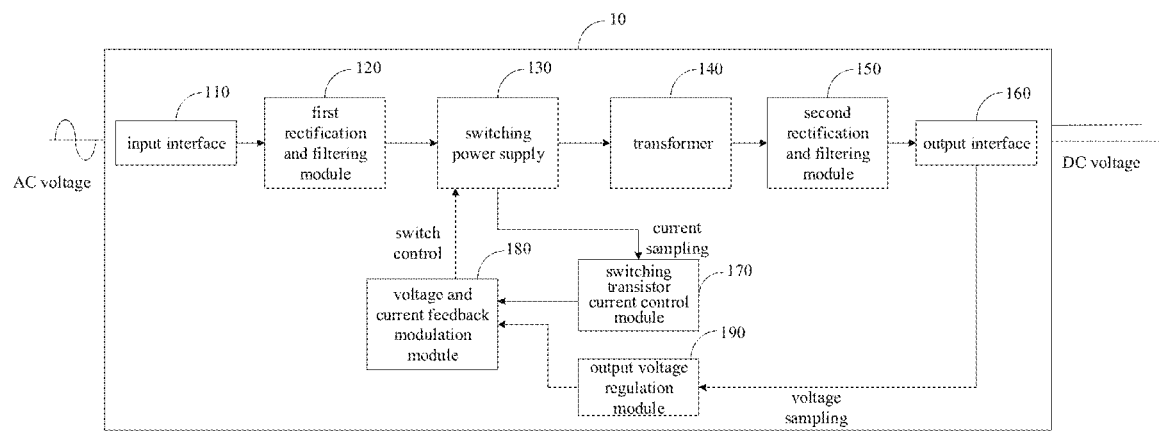
FIG. 1B is a schematic structural block diagram of a power supply device in the related art.

The power supply device 10 may receive commercial power supplied by a grid. Since the commercial power is an alternating-current (AC) voltage, and the charging voltage meeting the charging requirement is usually a direct-current (DC) voltage, the power supply device 10 is required to transform the received AC voltage to thereby obtain the DC voltage that may be used for charging the terminal device 20. To clearly illustrate the specific manner in which the power supply device 10 in the related art converts the AC voltage into the DC voltage, an example is illustrated with reference to FIG. 1B. FIG. 1B is a schematic structural block diagram of a power supply device in the related art.

As illustrated in FIG. 1B, the power supply device 10 may include an input interface 110, a first rectification and filtering module 120, a switching power supply 130, a transformer 140, a second rectification and filtering module 150, an output interface 160, a switching transistor current control module 170, a voltage and current feedback modulation module 180, and an output voltage regulation module 190. Specifically, an input terminal of the rectification and filtering module 120 may be connected to an output terminal of the input interface 110, an output terminal of the rectification and filtering module 120 is connected to an input terminal of the switching power supply 130, an input terminal of the transformer 140 is connected to an output terminal of the switching power supply 130, an output terminal of the transformer 140 may be connected to an input terminal of the second rectification and filtering module 150, and the output interface 160 may be connected to an output terminal of the second rectification and filtering module 150.

An AC voltage may be input to the power supply device 10 through the input interface 110 of the power supply device 10, and the first rectification and filtering module 120 may receive the AC voltage transmitted through the input interface 110 and perform rectification and filtering processing on the AC voltage, thereby obtaining a pulsating DC voltage having a first waveform. In at least one alternative embodiment, the first waveform may be a steamed-bun shaped waveform. The switching power supply 130 may perform chopper modulation on the pulsating DC voltage output by the first rectification and filtering module 120, thereby obtaining a pulsating voltage having a second waveform. In at least one alternative embodiment, the second waveform may be a square waveform. The transformer 140 may perform voltage transformation on the pulsating voltage that has been performed with the chopper modulation by the switching power supply 130, and the second rectification and filtering module 150 filters the voltage that has been performed with the voltage transformation by the transformer 140, thereby obtaining a stable DC voltage.

The switching transistor current control module 170 may be connected to the switching power supply 130 and the voltage and current feedback modulation module 180 individually, the switching transistor current control module 170 may perform current sampling on the switching power supply 130, and feedback the sampling current to the voltage and current feedback modulation module 180. The output voltage regulation module 190 may be connected to the output interface 160 and the voltage and current feedback modulation module 180 individually, the output voltage regulation module 190 may perform voltage sampling on the output interface 160, and feedback the sampling voltage to the voltage and current feedback modulation module 180.

The voltage and current feedback modulation module 180 may be connected to the switching power supply 130 and control on/off of the switching power supply 130 according to the current feedback from the switching transistor current control module 170 and the voltage feedback from the output voltage regulation module 190, so that a DC power output by the power supply device 10 can be adjusted.

In the related art, the power supply device 10 usually has a large volume. The embodiments of the disclosure provide a power supply device, which can reduce the volume of the power supply device.

Figure 2:
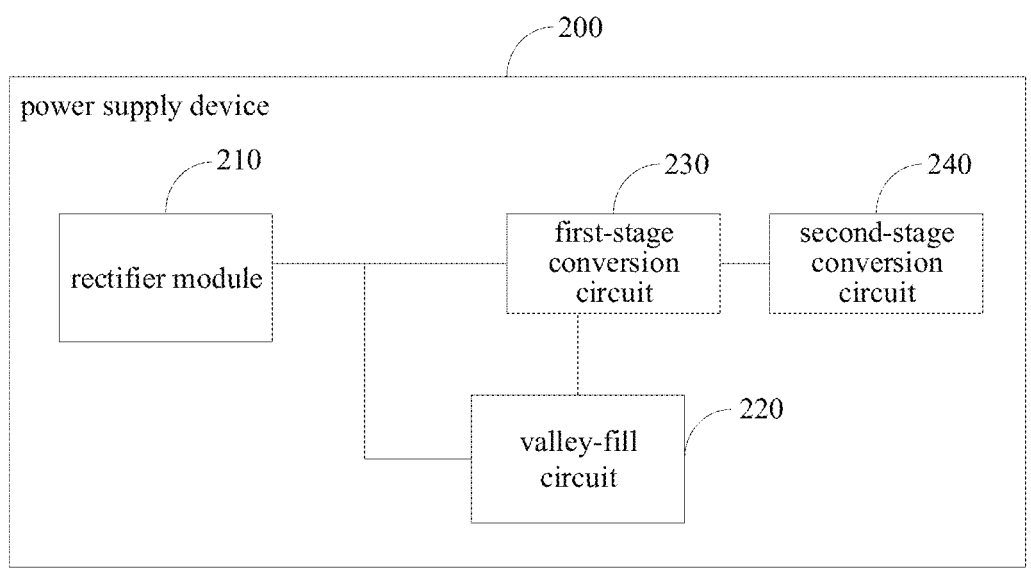
FIG. 2 is a schematic structural block diagram of a power supply device according to another embodiment of the disclosure.

FIG. 2 is a schematic structural block diagram of a power supply device according to another embodiment of the disclosure. As illustrated in FIG. 2, a power supply device 200 is provided. The power supply device 200 may include a rectifier module 210 (also referred to as a rectifier circuit), a valley-fill circuit 220, a first-stage conversion circuit 230 and a second-stage conversion circuit 240. Specifically, the rectifier module 210 may be connected to the first-stage conversion circuit 230. Furthermore, an output terminal of the valley-fill circuit 220 may be connected to an input terminal of the first-stage conversion circuit 230, and an output terminal of the rectifier module 210 may be connected to the first-stage conversion circuit 230.

The rectifier module 210 is configured (i.e., structured and arranged) to rectify AC power to thereby obtain a first pulsating DC voltage.

The power supply device 200 may receive the AC power through the input interface, in which the AC power may be commercial power received from a grid, and a voltage standard of the AC voltage may be set according to an actual application, for example, the voltage standard may be 220 volts (V), 100V, 110 v, but is not limited to these examples. The embodiments of the disclosure do not limit a specific voltage value of the AC voltage. The rectifier module 210 may perform the rectification on the received AC power and convert the AC voltage with positive and negative variations into a unidirectional pulsating DC voltage. In this way, the rectifier module 210 may obtain the first pulsating DC voltage with a first waveform and output the first pulsating DC voltage to the first-stage conversion circuit 230. In at least one alternative embodiment, the first pulsating waveform may be a curved waveform, such as a steamed-bun shaped waveform. The pulsating DC voltage refers to a DC voltage that is constant in direction but varies periodically in magnitude over time.

Figure 3A:
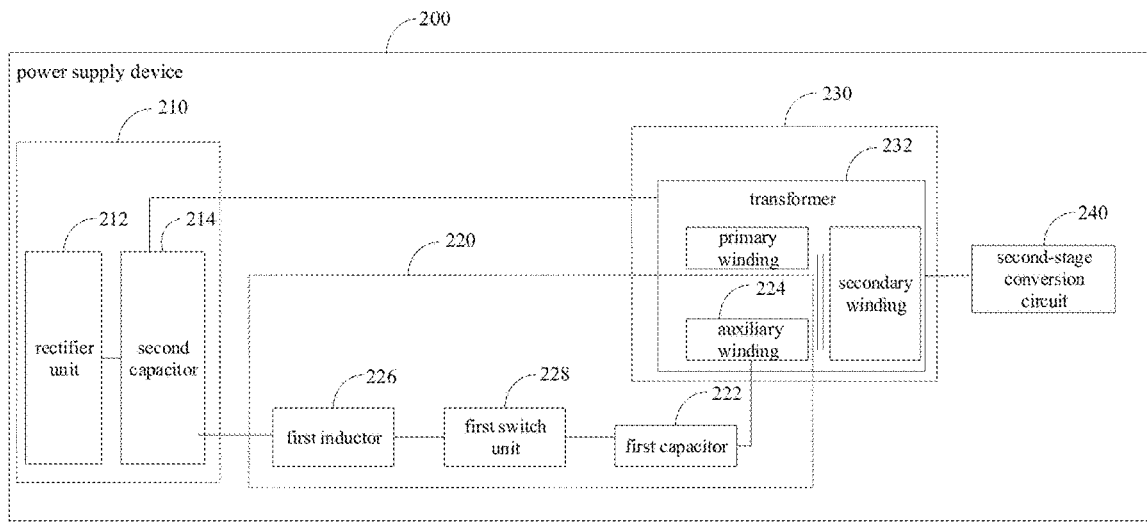
FIG. 3A is a schematic structural block diagram of a power supply device according to yet another embodiment of the disclosure.

As illustrated in FIG. 3A, in some embodiments, the rectifier module 210 may include a rectifier unit 212 and a second capacitor 214. Specifically, the rectifier unit 212 may be connected to the second capacitor 214. The rectifier unit 212 may include a diode bridge. The second capacitor 214 may be configured to filter the rectified AC voltage to thereby obtain the first pulsating DC voltage. In some embodiments, a capacitance of the second capacitor 214 may be less than a capacitance threshold. By selecting a second capacitor with a small capacitance, a volume of the second capacitor may be reduced, thereby reducing the volume of the entire power supply device 200.

In at least one alternative embodiments, the second capacitor 214 may include at least one selected from the group consisting of: a ceramic capacitor, a film capacitor, and an electrolytic capacitor with a capacitance less than the capacitance threshold. The ceramic capacitor may include a multi-layer ceramic capacitor (MLCC), which is formed by laminating ceramic materials and electrode materials in parallel. The film capacitors may be a capacitor obtained by overlapping a metal foil, which is taken as an electrode, and a plastic film such as a film made in polyethylene, polypropylene, polystyrene or polycarbonate from two sides, and winding the overlapped metal foil and the plastic film into a cylinder structure. It should be noted that, the second capacitor 214 may also be other chip capacitors, which is not limited herein.

The first-stage conversion circuit 230 is configured to perform isolation conversion on the first pulsating DC voltage to thereby obtain a second pulsating DC voltage.

The second-stage conversion circuit is configured to convert the second pulsating DC voltage into a stable DC voltage.

The first-stage conversion circuit 230 may efficiently perform voltage isolation conversion on the first pulsating DC voltage output by the rectifier module 210. In some embodiments, the first-stage conversion circuit 230 may be a voltage-buck circuit. The first-stage conversion circuit 230 may perform voltage-buck transformation on the first pulsating DC voltage output by the rectifier module 210 to obtain the second pulsating DC voltage. The second pulsating DC voltage may be smaller than the first pulsating DC voltage. For example, the first pulsating DC voltage input by the rectifier module is within 52-250V, and the second pulsating DC voltage obtained after the conversion by the first-stage conversion circuit 230 may be within 5-25V, but not limited to these examples. In at least one alternative embodiment, the first-stage conversion circuit 230 may also be a voltage-boost circuit, which is not limited herein.

Furthermore, the first-stage conversion circuit 230 may be connected to the valley-fill circuit 220 and supply the valley-fill circuit 220 with an input voltage to ensure normal operations of the valley-fill circuit 220.

The second-stage conversion circuit 240 converts the second pulsating DC voltage into the stable DC voltage. Specifically, the stable DC voltage may be a constant DC voltage or an approximately constant DC voltage (with a small amplitude), in which the constant DC voltage may be a DC voltage with a fixed voltage. In some embodiments, the stable DC voltage obtained by the second-stage conversion circuit 240 may be a charging voltage that meets the charging requirement of the terminal device, or alternatively be a DC voltage that requires further voltage transformation to meet the charging requirement.

The valley-fill circuit 220 is configured to supply, in response to a voltage value of the first pulsating DC being less than a first voltage threshold, electrical power to the input terminal of the first-stage conversion circuit 230 to thereby increase a valley voltage of the first pulsating DC voltage.

The valley voltage may refer to the minimum voltage value of the first pulsating DC voltage in a voltage magnitude change period. To reduce a volume of the adapter, the second capacitor 214 adopts a capacitor with a capacitance less than the capacitance threshold, and the valley voltage of the first pulsating DC voltage that has been performed the rectification by the second capacitor 214 is low (for example, 0V). When the pulsating DC voltage with the low valley voltage is directly input to the first-stage conversion circuit 230, the output of the second-stage conversion circuit cannot be maintained, resulting in poor voltage stability of the output of the second-stage conversion circuit. In addition, the low valley voltage of the first pulsating DC voltage obtained by the rectification results in a high peak current in the subsequent circuit, and thus a large magnetic element is required to complete the voltage conversion.

In the embodiments of the disclosure, the power supply device 200 is provided with the valley-fill circuit 220, the valley-fill circuit 220 is configured to supply, in response to a voltage value of the first pulsating DC being less than a first voltage threshold, electrical power to the input of the first-stage conversion circuit to thereby suppress a voltage drop of the first pulsating DC voltage output by the rectifier module 21, so that the valley voltage of the first pulsating DC voltage is increased to the first voltage threshold. Specifically, the first voltage threshold may be a value set as 50V, or 45V, etc., but not limited to these examples. In the embodiments of the disclosure, the first pulsating DC voltage that is performed with the voltage conversion by the first-stage conversion circuit 230 may refer to the first pulsating DC voltage whose valley voltage is the first voltage threshold, that is, refer to the first pulsating DC voltage input to the first-stage conversion circuit 230 after discharging electrical energy through the valley-fill circuit 220.

In some embodiments, the first voltage threshold is the output voltage of the valley-fill circuit 220. The valley-fill circuit 220 may be connected to the second capacitor 214 of the rectifier module 210. In response to the first pulsating DC voltage obtained by the second capacitor 214 being less than the first voltage threshold, the valley-fill circuit 220 starts to work and discharges electrical power to the second capacitor 214 to thereby maintain the first pulsating DC voltage obtained by the second capacitor 214 at the first voltage threshold, so that the first pulsating DC voltage obtained by the second capacitor 214 maintains at the first voltage threshold. The valley-fill circuit 220 may stop discharging electrical power to supply the second capacitor 214, in response to the first pulsating DC voltage output by the second capacitor 214 being greater than the first voltage threshold. In this way, it realizes a natural transition between the voltage output by the valley-fill circuit 220 when the valley-fill circuit 220 discharging electrical energy to the second capacitor 214 and the voltage output by the valley-fill circuit 220 when the valley-fill circuit 220 stops discharging electrical power to supply the second capacitor 214, so that there is no need to add an additional module for detecting and judging the voltage, which saves costs and further reduces the size of the power supply device 200.

In some embodiments, the input terminal of the valley-fill circuit 220 may be connected to the first-stage conversion circuit 230, the first-stage conversion circuit 230 may supply an input voltage to the valley-fill circuit 220 to ensure the normal operation of the valley-fill circuit 220.

In the embodiments of the disclosure, the rectifier module performs the rectification on the AC power to thereby obtain the first pulsating DC voltage; the first-stage conversion circuit performs the isolation conversion on the first pulsating DC voltage to thereby obtain the second pulsating DC voltage; the second-stage conversion circuit may convert the second pulsating DC voltage into the stable DC voltage; and the valley-fill circuit supplies, in response to the voltage value of the first pulsating DC being less than the first voltage threshold, the electrical power to the input terminal of the first-stage conversion circuit to increase the valley voltage of the first pulsating DC voltage. The valley voltage of the first pulsating DC voltage is increased by the valley-fill circuit, so that the first pulsating DC voltage input to the first-stage conversion circuit has the valley voltage which is high enough to provide sufficient power support for the first-stage conversion circuit, thereby ensuring the stability of the output voltage of the power supply device. In addition, the increased valley voltage of the first pulsating DC voltage can reduce the peak current in the subsequent voltage conversion, so the size of the magnetic component in the subsequent circuit can be reduced, thereby reducing the volume of the power supply device.

As illustrated in FIG. 3A, in some embodiments, the valley-fill circuit 220 may include a first capacitor 222 and an auxiliary winding 224.

The first capacitor is configured to supply, in response to the voltage value of the first pulsating direct-current voltage being less than the first voltage threshold, the electrical power to the input of the first-stage conversion circuit 230 to thereby increase the valley voltage of the first pulsating direct-current voltage to the first voltage threshold.

Furthermore, in response to the voltage value of the first pulsating DC voltage obtained by the rectifier module 210 being less than the first voltage threshold, the first capacitor 222 may be discharged to supply the electrical power to the second capacitor 214 of the rectifier module 210, so as to maintain the first pulsating DC voltage at the first voltage threshold. The first capacitor 222 may stop discharging the electrical power, in response to the voltage value of the first pulsating DC voltage being greater than the first voltage threshold.

In at least one alternative embodiment, the capacitance of the first capacitor 222 may less than the capacitance threshold. The first capacitor 222 may include at least one selected from a ceramic capacitor, a film capacitor, and an electrolytic capacitor with a capacitance less than the capacitance threshold, etc. The ceramic capacitors may include MLCC capacitors, etc., but are not limited thereto. Using the first capacitor with small capacitance can reduce the volume of the first capacitor, thereby reducing the volume of the entire power supply device 200 and improving the portability of the power supply device 200.

The first-stage conversion circuit 230 may include a transformer 232. The transformer 232 may include a primary winding and a secondary winding, and shares the above auxiliary winding 224. The auxiliary winding 224 and the primary winding are coupled to each other. The transformer 232 may lower the first pulsating DC voltage received by the first-stage conversion circuit 230. When the AC voltage flows through the primary winding, an iron core of the transformer 232 may generate an induced magnetic field, and the auxiliary winding 224 may generate an induced electromotive force. The auxiliary winding 224 is configured to output a voltage according to generated induced electromotive force.

A first diode may be provided between the auxiliary winding 224, an anode of the first diode may be connected to the auxiliary winding 224, and a cathode of the first diode may be connected to the first capacitor 222. The first diode may be configured to perform rectification on an output voltage of the auxiliary winding 224 to obtain a rectified output voltage, and charge the first capacitor 222 with the rectified output voltage, so that the first capacitor 222 may store electrical energy. In at least one alternative embodiment, the first diode performs half-wave rectification on the output voltage of the auxiliary winding 224. In other embodiments, components such as a rectifier bridge may also be used to perform full-wave rectification on the output voltage of the auxiliary winding 224. The manner of rectifying the output voltage of the auxiliary winding 224 is not limited herein.

In addition, as illustrated in FIG. 3A, in some embodiments, the valley-fill circuit 220 may further include a first inductor 226 and a first switch unit 228 (also referred to as a first switch circuit) in addition to the first capacitor 222 and the auxiliary winding 224. Specifically, the first inductor 226 may be connected to the second capacitor 214 and the first switch unit 228 individually, and the first switch unit 228 may be connected to the first capacitor 222.

The first switch unit 228 may be configured to perform chopper modulation on a voltage output by the first capacitor 222. The first switch unit 228 switches on and off states in a high-frequency manner to thereby perform the chopper modulation on a voltage output by the first capacitor 222.

When the valley-fill circuit 220 charges the second capacitor 214, the first inductor 226 and the second capacitor 214 may form a first-stage inductance-capacitance (LC) filter. The first-stage LC filter may filter the voltage that has been performed with the chopper modulation by the first switch unit 228. In this way, the voltage ripple output by the valley-fill circuit can be reduced, thereby enabling the voltage which is output by the valley-fill circuit 220 to the second capacitor 214 to be stable a DC voltage, which can be conductive to maintaining the voltage value of the first pulsating DC voltage at the first voltage threshold.

Figure 3B:
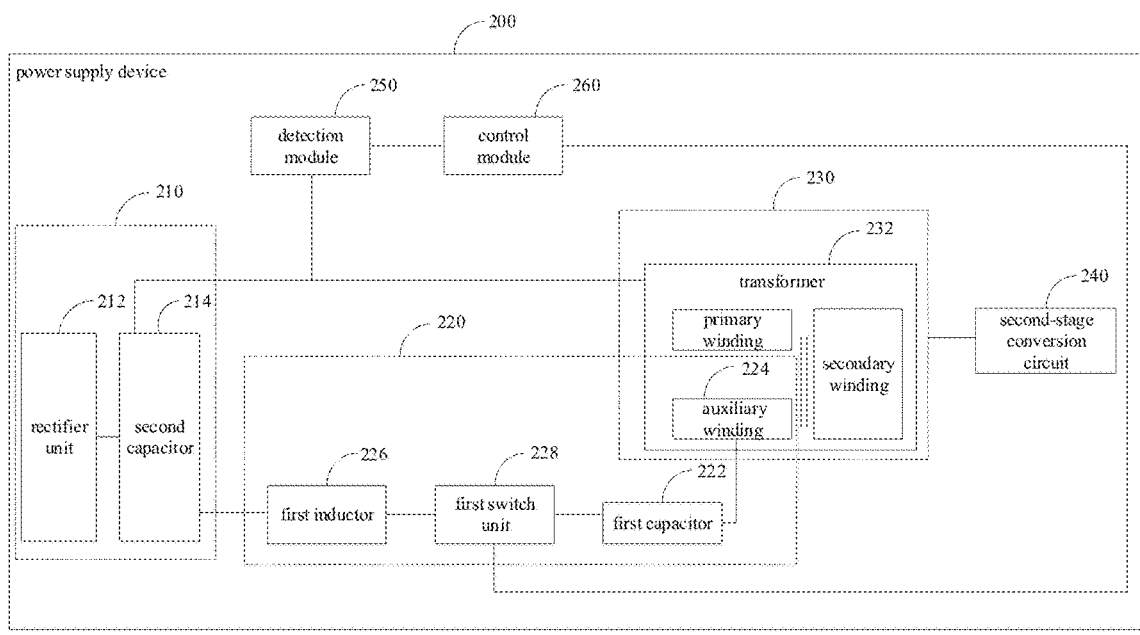
FIG. 3B is a schematic structural block diagram of a power supply device according to still another embodiment of the disclosure.
Figure 3C:
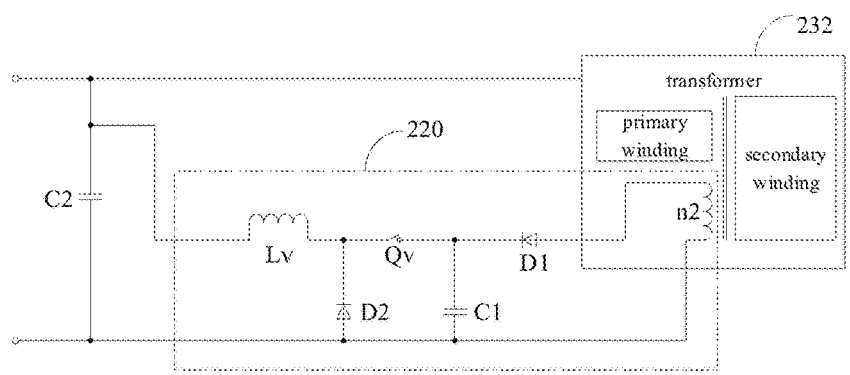
FIG. 3C is a schematic structural block diagram of a power supply device according to still yet another embodiment of the disclosure.

FIG. 3C is a schematic diagram of valley-fill circuit according to some embodiments. As illustrated in FIG. 3C, the valley-fill circuit 220 may be connected to the second capacitor C2 of the rectifier module 210. The valley-fill circuit 220 may include a first capacitor C1, an auxiliary winding n2, a first inductor Lv, a first switch unit Qv, a first diode D1 and a second diode D2. The auxiliary winding n2 may be arranged on the transformer 232 and output a voltage through a generated induced electromotive force, and the voltage may be supplied to the first capacitor C1 to store the energy therein. The first switch unit Qv, the second diode D2, the first inductor Lv and the second capacitor C2 may form a voltage-buck conversion circuit (also referred to as a buck circuit). Specifically, the second diode may be used for freewheeling (i.e., the second diode is also referred to as a flyback diode). By using the second diode D2 and the first inductor Lv, the voltage output by the valley-fill circuit may be stabilized to avoid the generation of surge voltage. The first inductor Lv and the second capacitor C2 may form a first-stage LC filter, which may filter the high-frequency chopped voltage (that is, the voltage that has been performed with the chopping modulation by the first switch unit Qv) flowing through the first switch unit Qv to obtain the stable DC voltage, so that the voltage loaded on two terminals of the second capacitor C1 is stable.

As illustrated in FIG. 3C, a terminal of the first inductor Lv is connected to a terminal of the second capacitor C2, another terminal of the first inductor Lv is connected to a negative terminal of the second diode D2 and a terminal of the first switch unit Qv, another terminal of the first switch unit Qv is connected to a negative terminal of the first diode D1 and a terminal of the first capacitor C1, and another terminal of the first capacitor C1 is connected to a positive terminal of the second diode D2, another terminal of the second capacitor C2, and the auxiliary winding n2.

It should be noted that the specific circuit structure of the valley-fill circuit 220 is not limited to the structure illustrated in FIG. 3C, and the valley-fill circuit 220 may also be implemented as other circuit structures. For example, the valley-fill circuit 220 may be implemented as a boost circuit.

Exemplarily, as illustrated in FIG. 3B, in some embodiments, the power supply device 200 includes a detection module 250 (also referred to as a detection circuit) and a control module 260 (also referred to as a control circuit) in addition to a rectification module 210 (also referred to as a rectification circuit), a valley-fill circuit 220, a first-stage conversion circuit 230, a second-stage conversion circuit 240. The detection module 250 may be connected to the input terminal of the first-stage conversion circuit 230, an input terminal of the control module 260 may be connected to an output terminal of the detection module 250, and an output terminal of the control module 260 may be connected to the first switch unit 228.

The detection module 250 is configured to detect the voltage value of the first pulsating DC voltage input to the first-stage conversion circuit 230. The control module 260 may be configured to control on/off of the first switch unit 228 according to the voltage value of the first pulsating DC voltage detected by the detection module 250.

The detection module 250 may perform voltage sampling on the first pulsating DC voltage input to the first-stage conversion circuit 230, collect the voltage value of the first pulsating DC voltage, and generate a detection signal according to the voltage value. As an alternative implementation, the detection signal may be the voltage value of the first pulsating DC voltage. In response to receiving the detection signal, the control module 260 may determine the voltage value of the first pulsating DC voltage based on the detection signal, and determine whether the voltage value of the first pulsating DC voltage is less than the first voltage threshold. For example, the control module 260 includes a voltage dividing resistor, and the first pulsating DC voltage is sampled by using voltage dividing by the resistor to thereby generate the detection signal. Alternatively, the control module 260 includes a voltage detection chip, and the voltage detection chip is configured to detect the voltage value of the first pulsating DC voltage.

As another alternative implementation, the detection signal may also be a judgment result of whether the voltage value of the first pulsating DC voltage is less than the first voltage threshold. The detection module 250 collects the voltage value of the first pulsating DC voltage, may directly determine whether the voltage value of the first pulsating DC voltage is less than the first voltage threshold, and generates the detection signal according to the judgment result. Exemplarily, the detection module 250 may include a comparator, and the collected voltage value of the first pulsating DC voltage may be input into the comparator, and the comparator may determine the relationship between the voltage value and the first voltage threshold to obtain the detection signal. When receiving the detection signal, the control module 260 can directly determine whether the voltage value of the first pulsating DC voltage is less than the first voltage threshold according to the detection signal.

The control module 260 controls the valley-fill circuit 220 to start to work, when the voltage value of the first pulsating direct-current voltage is determined to be less than the first voltage threshold according to the detection signal. In response to the valley-fill circuit 220 starting to work, the control module 260 may transmit a control signal to the first switch unit 228. The first switch unit 228 may be configured to switch, according to the control signal output by the control module 260, the on and off states in the high-frequency manner to thereby perform the chopper modulation on the voltage output by the first capacitor 222. After the first conductor 226 transforms the voltage that has been performed with the chopper modulation, the second capacitor 214 is input with a stable voltage.

After the valley-fill circuit 220 starts to work, the detection module 250 may detect the voltage value of the first pulsating DC voltage input to the first-stage conversion circuit 230 continuously, and output a detection signal to the control module 260. Similarly, the detection signal may be the voltage value of the first pulsating DC voltage, or may be the judgment result of whether the voltage value of the first pulsating DC voltage is greater than the first voltage threshold. The control module 260 may be configured to control the valley-fill circuit 220 to stop working, when the voltage value of the first pulsating DC voltage detected by the detection module is determined to be greater than the first voltage threshold based on the detection signal. When the valley-fill circuit 220 is controlled to stop working, the first switch unit 228 may be in the off state, the valley-fill circuit 220 stops working, and the first capacitor 222 stops discharging electrical power to the second capacitor 214.

In some embodiments, the first voltage threshold may be determined according to the voltage standard of the AC voltage and/or the output power required to be output by the power supply device 200, and the like. Different first voltage thresholds may be set for AC voltages of different voltage standards, and the value of the first voltage threshold may also be adjusted according to the output power required to be output by the power supply device 200. Through providing the detection module 250 and the control module 260, the valley voltage of the first pulsating voltage can be accurately controlled at the first voltage threshold, so that the first pulsating voltage input to the first-stage conversion circuit 230 can meet different requirements.

In the embodiments of the disclosure, by using the detection module 250 and the control module 260, the voltage value of the first pulsating DC voltage can be accurately detected, and the startup and shutdown of the valley-fill circuit 220 can be accurately controlled, and the valley voltage of the output first pulsating DC voltage output by the rectifier module 210 can be accurately controlled, so that the stability of the voltage output by the power supply device 200 is improved.

Figure 4:
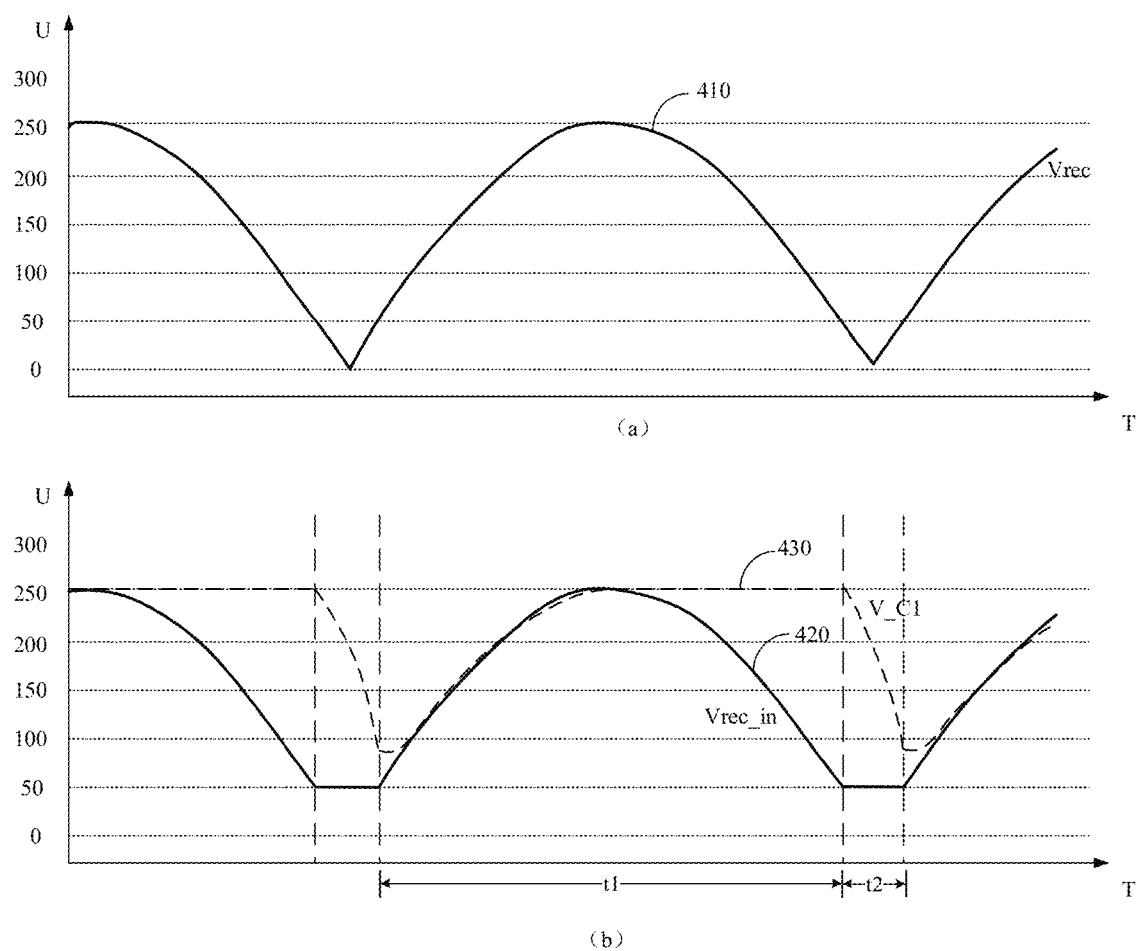
FIG. 4 is a schematic waveform diagram of a first pulsating direct-current voltage according to an embodiment of the disclosure.

FIG. 4 is a schematic waveform diagram of a first pulsating direct-current voltage according to an embodiment. As illustrated in FIG. 4, please refer to a Vrec curve 410 in FIG. 4(*a*), the Vrec curve 410 represents the first pulsating DC voltage output by the rectifier module 210 when the power supply device is not provided with the valley-fill circuit 220. It can be known from the Vrec curve 410 that the valley voltage of the first pulsating DC voltage is 0V when the valley-fill circuit 220 is not provided. Please refer to a Vrec_in curve 420 in FIG. 4(*b*), the Vrec_in curve 420 represents the first pulsating DC voltage output by the rectifier module 210 in the power supply device provided with the valley filling circuit 220. It can be known from the Vrec_in curve 420 that the valley voltage of the first pulsating DC voltage is 50V when the valley-fill circuit 220 is provided, that is, the valley-fill circuit 220 can increase the valley voltage of the first pulsating DC voltage from 0V to 50V. Further, please refer to a V_C1 curve 530 in FIG. 4(*b*), the V_C1 curve 530 represents the voltage of the first capacitor 222 in the valley-fill circuit 220. During the time period t1, the Vrec curve 410 and the Vrec_in curve 420 are the same, the first capacitor 222 of the valley-fill circuit 220 is charged to store energy. In response to the voltage value of the first pulsating DC voltage drops to 50V, the valley-fill circuit 220 starts to work. During the time period t2, the first capacitor in the valley-fill circuit 220 discharges electrical power and charges the second capacitor 214 to maintain the voltage value of the first pulsating DC voltage at 50V, thereby effectively improving the voltage value of the first pulsating DC voltage. It should be noted that FIG. 4 only illustrates a possible waveform and voltage value of the first pulsating DC voltage, which is only used to describe the embodiment of the disclosure, but not specifically limit the waveform and the voltage value of the first pulsating DC voltage in the embodiments of the disclosure.

Figure 5:
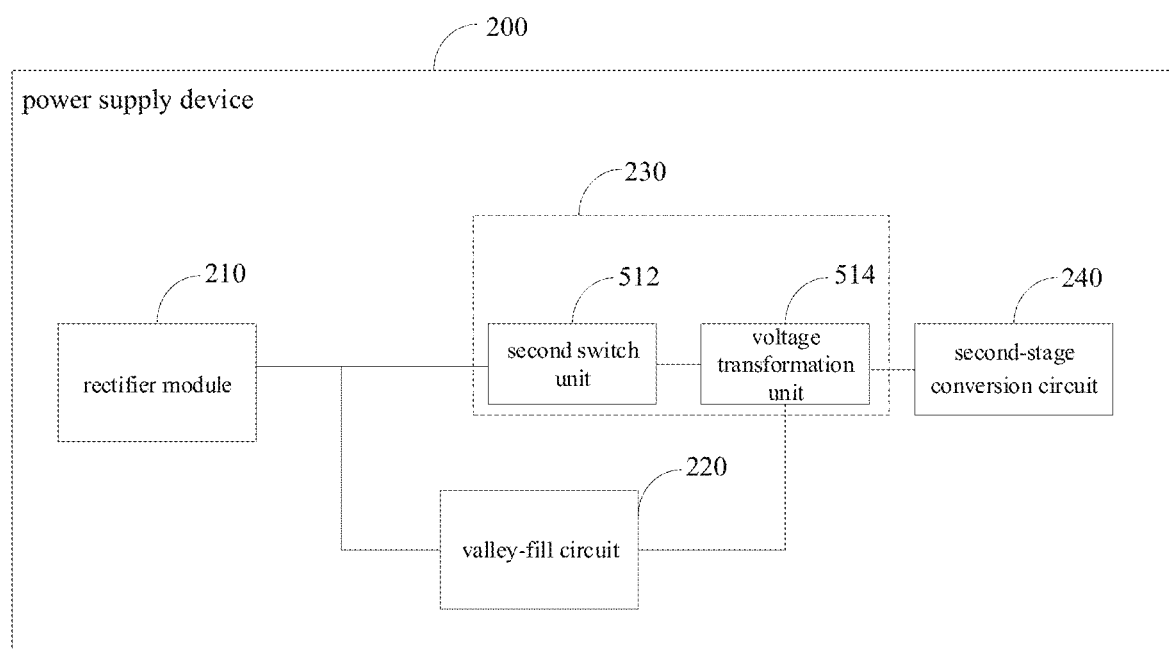
FIG. 5 is a schematic structural block diagram of a power supply device according to further still yet another embodiment of the disclosure.

FIG. 5 is a schematic structural block diagram of a power supply device according to another embodiment of the disclosure. As illustrated in FIG. 5, in some embodiments, the first-stage conversion circuit 230 may include a second switch unit 512 (also referred to as a second switch circuit) and a voltage transformation unit 514. Specifically, the second switch unit 512 may be connected to the output terminal of the rectifier module 210, the voltage transformation unit 514 may be connected to the second switch unit 512. The second switch unit 512 may be configured to perform chopping modulation on the received first pulsating DC voltage to obtain a modulated voltage, and then the voltage transformation unit 514 performs a voltage-buck transformation on the modulated voltage.

Figure 6:
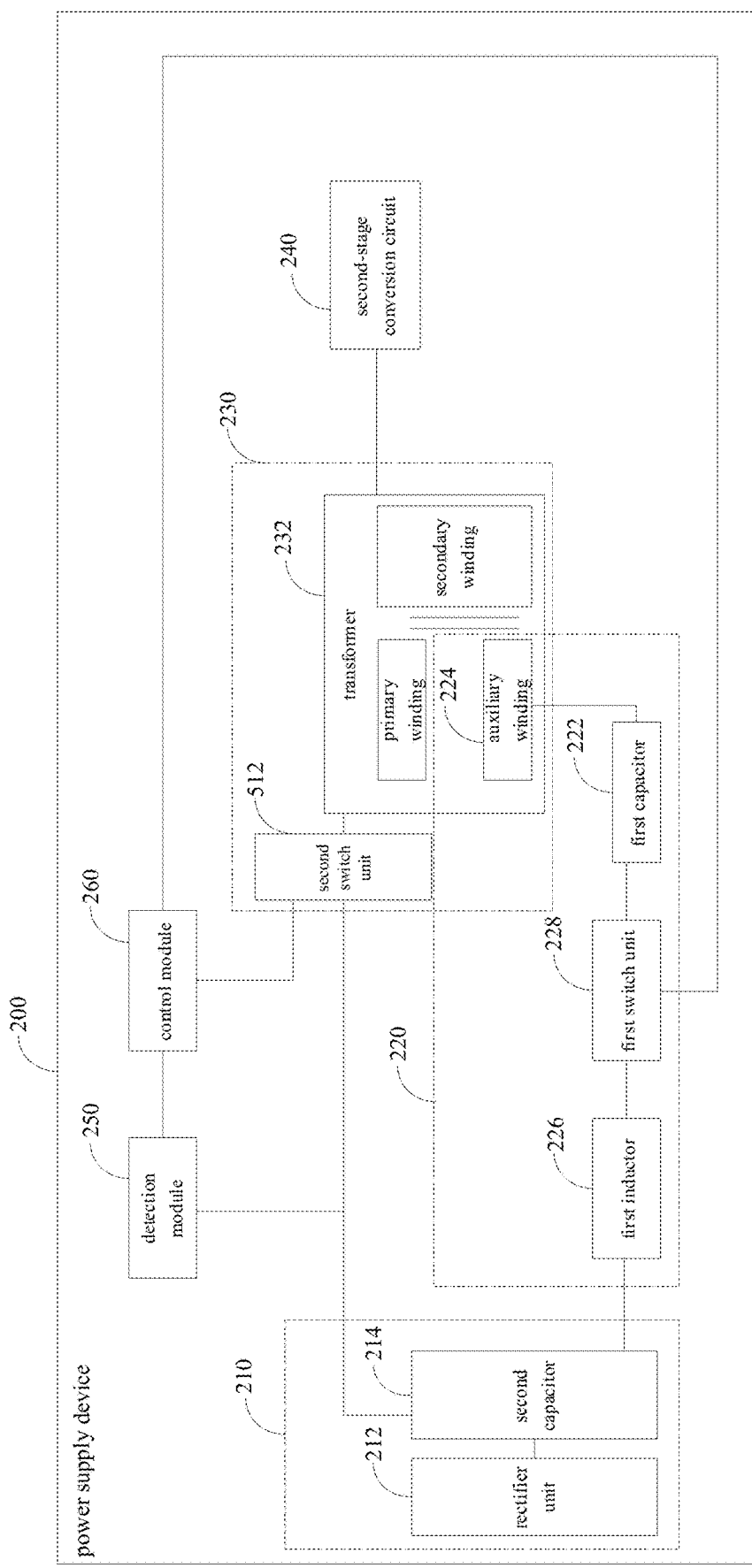
FIG. 6 is a schematic structural block diagram of a power supply device according to even still yet another embodiment of the disclosure.

In some embodiments, as illustrated in FIG. 6, the voltage transformation unit 514 may include the transformer 232. The transformer 232 may include the primary winding, the secondary winding, and the auxiliary winding, and the auxiliary winding and the primary winding may be coupled to each other. The auxiliary winding outputs voltage through the generated induced electromotive force to thereby charge the capacitor 222 of the valley-fill circuit 220.

The second switch unit 512 may be connected to the control module 260, and the second switch unit may include at least four switch components configured to form a switch network supporting a full-bridge operating mode and a half-bridge operating mode. In at least one alternative embodiment, the switch component may be a power switch component, which may include a metal-oxide-semiconductor field-effect transistor (MOSEFET), a gallium nitride (GaN) switch component, etc., but not limited to these examples.

The detection module 250 may perform voltage sampling on the first pulsating DC voltage input to the first-stage conversion circuit 230 to detect the voltage value of the first pulsating DC voltage. The manner by which the detection module 250 detects the voltage value of the first pulsating DC voltage may be referred to the relevant descriptions in the foregoing embodiments, and details will not be repeated herein.

The control module 260 is configured to control, in response to the voltage value of the first pulsating direct-current voltage detected by the detection module 250 being greater than a second voltage threshold, the second switch unit to switch to the half-bridge operating mode. The control module 260 is further configured to control, in response to a voltage effective value of the first pulsating direct-current voltage detected by the detection module 250 being less than a third voltage threshold, the second switch unit to switch to the full-bridge operating mode.

When the voltage value of the first pulsating DC voltage is detected to be greater than the second voltage threshold, it may indicate that the first pulsating DC voltage belongs to a high voltage range. When an effective voltage value of the first pulsating DC voltage is detected to be less than a third voltage threshold, it may indicate that the first pulsating DC voltage belongs to a low voltage range. In at least one alternative embodiment, in addition to the voltage effective value, a peak voltage, or an average voltage, etc. of the first pulsating DC voltage may also be detected to determine whether it is lower than the third voltage threshold. That is, the embodiments are not limited to the voltage effective value. Specifically, the peak voltage refers to the maximum voltage value of the first pulsating DC voltage in a period of voltage change. Specifically, the maximum voltage of the high voltage range may be greater than the maximum voltage of the low voltage range. For example, the high voltage range may be 50-220V, the low voltage range may be 45-120V, and the embodiments are not limited to these examples. The second switch module (also referred to as the second switch unit or the second switch circuit) may work in the half-bridge operating mode when the input first pulsating DC voltage is in the high voltage range, and the second switch module may work in the full-bridge operating mode when the input second pulsating DC voltage is in the low voltage range. In this way, it can be ensured that a variation of the second pulsating DC voltage output by the first-stage conversion circuit 230 can be maintained within a narrow range when a variation range of the input first pulsating DC voltage is wide, which is convenient for the design and the voltage transformation of the subsequent second-stage conversion circuit 240.

Figure 7:
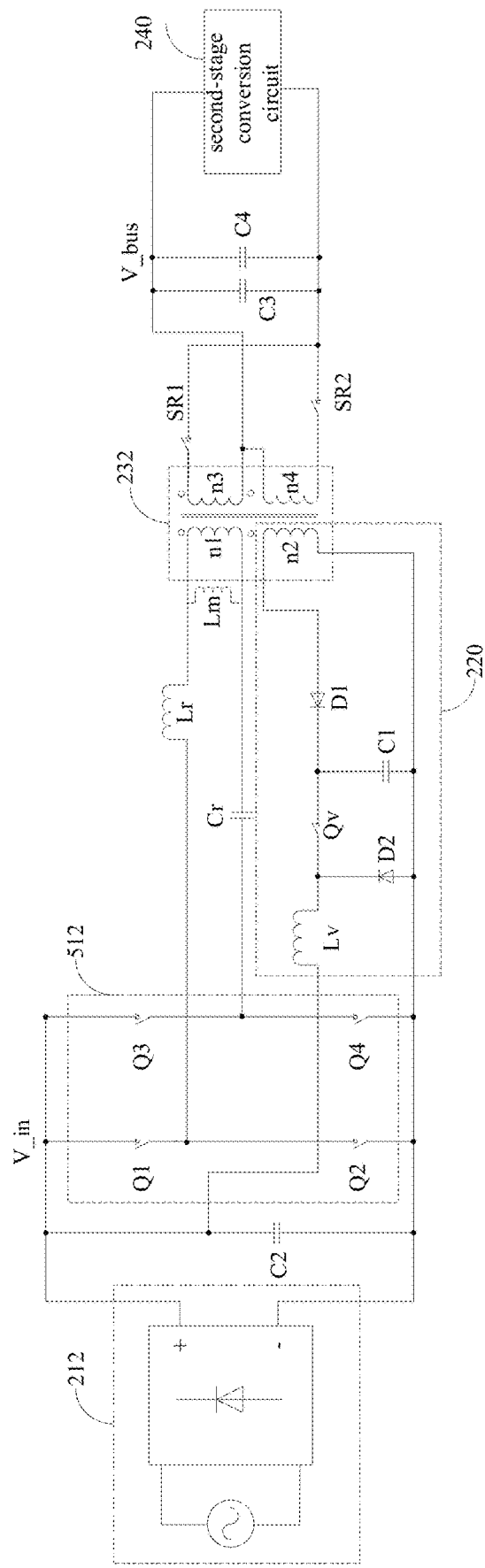
FIG. 7 is a schematic diagram of a first-stage conversion circuit according to an embodiment of the disclosure.

FIG. 7 is a schematic diagram of the first-stage conversion circuit according to an embodiment of the disclosure. As illustrated in FIG. 7, the second switch unit 512 may include four switch components respectively being a switch Q1, a switch Q2, a switch Q3 and a switch Q4. The switch Q1 and the switch Q2 may work, when the second switch unit 512 is in the half-bridge operating mode. The four switch components may work together, when the second switch unit 512 is in the full-bridge operating mode. The control module 260 may transmit control signals to the switch Q1, the switch Q2, the switch Q3 and the switch Q4 respectively to thereby control the on/off states of the switch Q1, the switch Q2, the switch Q3 and the switch Q4 respectively. In at least one alternative embodiments, the control signal may be a pulse signal. For example, when the second switch unit 512 is in the half-bridge operating mode, the control module 260 may only send driving signals to the switch Q1 and the switch Q2 to control the switch Q1 and the switch Q2 to switch between the on and off states, and at the same time, the control module 260 may control the switch Q3 to maintain the off state, and control the switch Q4 to maintain the on state.

The voltage transformation unit 514 may include a transformer 232, a switch SR1, a switch SR2, a third capacitor C3 and a fourth capacitor C4. An AC voltage is rectified by the rectifier unit 212 and filtered by the second capacitor C2 to obtain a first pulsating DC voltage, and the first pulsating DC voltage (i.e., V_in) is input to the second switch unit 512. After the input first pulsating DC voltage is performed with chopper modulation by the second switch unit 512 to obtain a modulated voltage, the modulated voltage is input to the transformer 232. The modulated voltage is performed with voltage-buck processing by the transformer 232, and then be filtered through the third capacitor C3 and the fourth capacitor C4 to obtain a second pulsating DC voltage (i.e., V_bus) with less fluctuation. The second pulsating DC voltage may be input to the second-stage conversion circuit 240 to perform voltage transformation. The transformer 232 may include a primary winding n1, a secondary winding n2, a secondary winding n3, and an auxiliary winding n2, and the auxiliary winding n2 may be configured to charge the first capacitor C1.

In some embodiments, the first-stage conversion circuit 230 may be a DC transformer based on an LLC resonant converter, and the first-stage conversion circuit 230 may further include a resonant capacitor Cr, a resonant inductance Lr, and an excitation inductance Lm. The resonant capacitor Cr, the resonant inductance Lr, the excitation inductance Lm may form a resonant network, and the resonant capacitor Cr can prevent the transformer 232 from entering a saturated state, so as to achieve an efficient isolation conversion on the first pulsating DC voltage.

The switches SR1 and SR2 may be used to rectify a voltage output by the transformer 232. In at least one alternative embodiment, the control module 260 may further transmit control signals to the switch SR1 and the switch SR2 to thereby control the on/off states of the switch SR1 and the switch SR2. By controlling the on and off states of the switch SR1 and the switch SR2, an output power of the transformer 232 may be adjusted, thereby enabling the obtained second pulsating DC voltage to meet the requirement.

It should be noted that FIG. 7 only illustrated a circuit structure implementation of the first-stage conversion circuit 230, and the first-stage conversion circuit 230 may also be implemented as other circuit topologies, and may include more or less components than the components illustrated in FIG. 7. The embodiments of the disclosure do not make specific limitations for the first-stage conversion circuit.

In the embodiment of the disclosure, the valley voltage of the first pulsating DC voltage input to the first-stage conversion circuit 230 may be increased by the valley-fill circuit 220, so that the valley voltage of the second pulsating DC voltage output by the first-stage conversion circuit 230 may be increased, and the fluctuation of the output second pulsating DC voltage is decreased. In this way, the second pulsating DC voltage can be easily converted by the second-stage conversion circuit 240, and a simple circuit design of the second-stage conversion circuit 240 can also be achieved.

In some embodiments, the second-stage conversion circuit 240 may include a direct-current to direct-current conversion circuit (DC-DC circuit), and the second-stage conversion circuit 240 may convert the second pulsating DC voltage output by the first-stage conversion circuit 230 into a stable DC voltage, and output the stable DC voltage. In at least one alternative embodiment, the second-stage conversion circuit 240 may include a buck-boost circuit which may convert the second pulsating DC voltage higher than the target voltage or lower than the target voltage into the stable DC voltage. Specifically, the DC voltage may be a constant DC voltage whose voltage value is a target voltage. It should be noted that the constant DC voltage in the disclosure may refer to a DC voltage with a certain fluctuation.

Figure 8:
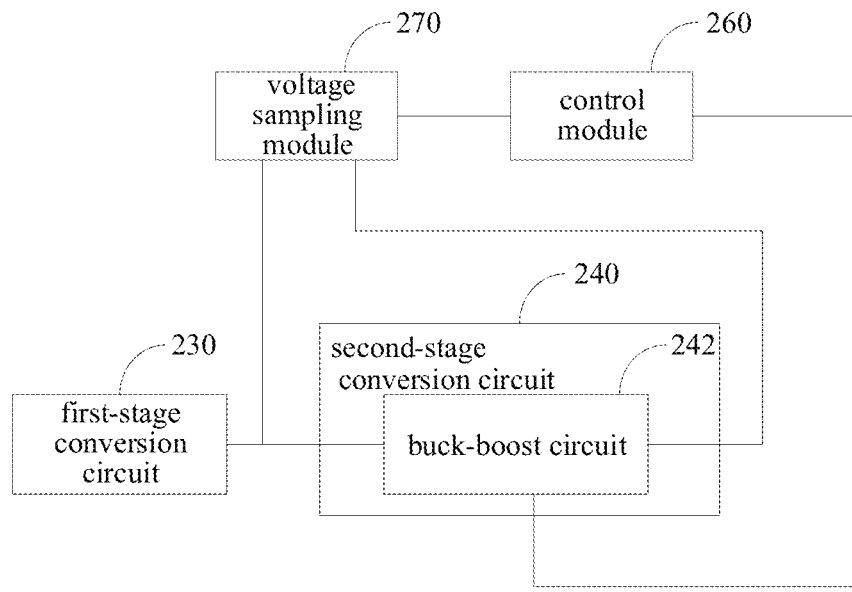
FIG. 8 is a schematic structural diagram illustrating connection of a buck-boost circuit according to an embodiment of the disclosure.

Exemplarily, FIG. 8 is a schematic structural diagram illustrating connection of a buck-boost circuit according to an embodiment of the disclosure. As illustrated in FIG. 8, in some embodiments, the second-stage conversion circuit 240 may include a buck-boost circuit 242, the power supply device may further include a voltage sampling module 270. The voltage sampling module 270 may be connected to the output terminal of the first-stage conversion circuit 230, the output terminal of the buck-boost circuit 242 and the control module 260 individually. The voltage sampling module 270 may detect the voltage value of the second pulsating DC voltage output by the first-stage conversion circuit 230 and the output voltage of the buck-boost circuit 242, and output a feedback signal to the control module 260. The control module 260 may receive the feedback signal output by the voltage sampling module 270, and obtain, according to the feedback signal, the voltage value of the second pulsating DC voltage and the output voltage of the buck-boost circuit 242, and may compare the voltage value of the second pulsating DC voltage and the output voltage of the buck-boost circuit 242 to obtain a comparison result, and control, according to the comparison result, the buck-boost circuit 242 to be in an operation mode. The control module 260 can accurately control the switching of the operation modes of the buck-boost circuit 242, so that the output DC voltage is stable and accurate, and the buck-boost circuit 242 only works in one mode, which can save power consumption.

The operating modes of the buck-boost circuit 242 may include a buck circuit mode and a boost circuit mode. The control module 260 may control the buck-boost circuit 242 to switch to the buck circuit mode, when the control module 260 detects that the voltage value of the second pulsating DC voltage is greater than the output voltage of the buck-boost circuit 242. The control module 260 may control the buck-boost circuit 242 to switch to the boost circuit mode, when the control module 260 detects that the voltage value of the second pulsating DC voltage is less than the output voltage of the buck-boost circuit 242.

Figure 9:
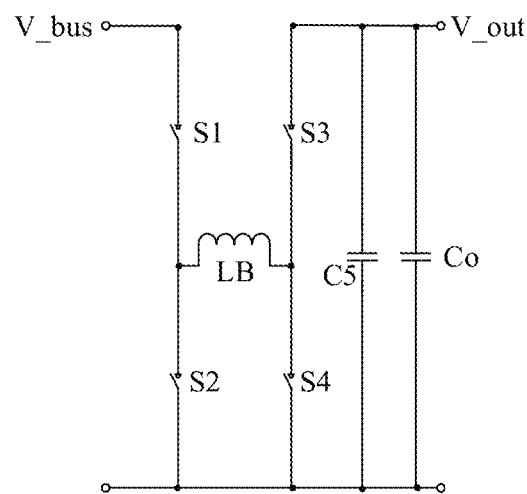
FIG. 9 is a schematic structural diagram of the buck-boost circuit according to an embodiment of the disclosure.

Exemplarily, FIG. 9 is a schematic structural diagram of the buck-boost circuit according to an embodiment of the disclosure. As illustrated in FIG. 9, the buck-boost circuit 242 may include a switch component S1, a switch component S2, a switch component S3, a switch component S4, an inductor LB, a capacitor C5 and a capacitor Co. Specifically, the capacitor C5 and the capacitor Co may be configured to filter the output voltage to thereby enable the output voltage to maintain stable. When the buck-boost circuit 242 works in the buck circuit mode, the switch component S3 is always on, the switch component S4 is always off, and the switch component S1 and the switch component S2 switch between on and off. The control module 260 may control the switch component S1 and the switch component S2 to switch the on and off states in a high-frequency manner. By switching the on and off states of the switch component S1 and the switch component S2, the chopper modulation of the second pulsating DC voltage is realized, and the input second pulsating DC voltage is decreased by the inductor LB to obtain the stable DC voltage.

When the buck-boost circuit 242 works in the boost circuit mode, the switch component S1 is always on, the switch component S2 is always off, and the switch component S3 and the switch component S4 switch between on and off. When the switch component S4 is on and the switch component S3 is off, the second pulsating DC voltage (i.e., the V_bus) may charge the inductor LB. When the switch component S3 is on and the switch component S4 is off, the second pulsating DC voltage (i.e., the V_bus) and the inductor LB may together supply the output terminal. By switching the switch component S3 and the switch component S4 between the on and off states, it enables the second pulsating DC voltage to be performed with the chopper modulation, and the input second pulsating DC voltage is increased by the inductor LB to obtain the stable DC voltage.

It should be noted that the above switch component S1, switch component S2, switch component S3, and switch component S4 may be such as diodes, MOS transistors, etc., which are not limited to these examples. The buck-boost circuit 242 may also be implemented as other circuit topologies, which is not limited to the structure illustrated in FIG. 9. The buck-boost circuit 242 may also perform voltage comparison by itself to adjust the operating mode and the on/off states of each switch component, that is, the above control module 260 and the voltage sampling module 270 is not necessary for the buck-boost circuit. The secondary conversion circuit 240 may also be other DC-DC circuits, and is not limited to the above buck-boost circuit.

In the embodiments of the disclosure, a two-stage circuit structure is adopted to transform the rectified pulsating DC voltage to thereby obtain a stable DC voltage, which can ensure that the DC voltage output by the power supply device is stable. In addition, after the valley voltage of the first pulsating DC voltage is increased, the valley voltage of the second pulsating DC voltage input to the second-stage conversion circuit is also increased, which can reduce the peak current of the second-stage conversion circuit, thus reducing the size of the magnetic component in the second-stage conversion circuit, thereby reducing the volume of the power supply device.

Furthermore, all capacitors in the embodiments of the disclosure may have capacitances less than the capacitance threshold, thereby making the entire power supply device compact, effectively reducing the volume of the power supply device, and improving the portability of the power supply device.

In the embodiments of the disclosure, the valley-fill circuit increase the valley voltage of the first pulsating DC voltage input to the first-stage conversion circuit. Compared with a manner in which the valley-fill circuit is configured to increase the valley voltage of the second pulsating DC voltage that is obtained by performing transformation on the first pulsating DC voltage by the first-stage conversion circuit, or a manner in which the valley-fill circuit is configured to increase the valley voltage of the DC voltage output by the second-stage conversion circuit after the second-stage conversion circuit outputs the stable DC voltage, the efficiency of the valley-fill circuit in the embodiments of the disclosure is higher. The reason for the higher efficiency is that the valley-fill circuit directly increases the valley voltage of the first pulsating DC voltage input to the first-stage conversion circuit, and the voltage output from the valley-fill circuit can be high.

Figure 10:
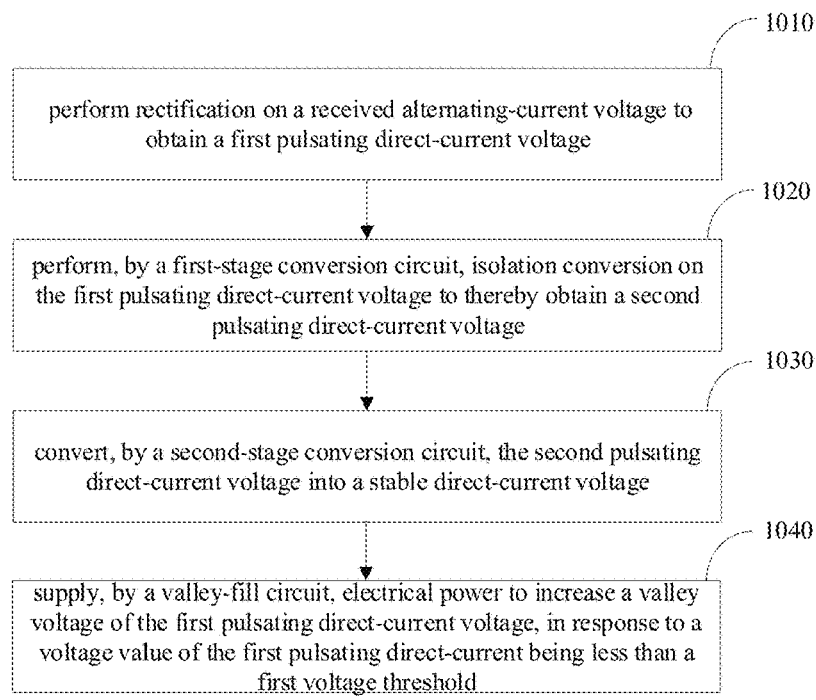
FIG. 10 is a schematic flowchart of a charging method according to an embodiment of the disclosure.

As illustrated in FIG. 10, in some embodiments, a charging method is provided. The method may be performed by the power supply device described in the above embodiments, and the method may include the operations as follows.

At operation 1010, perform rectification on a received AC voltage to obtain a first pulsating DC voltage.

At operation 1020, perform, by a first-stage conversion circuit, isolation conversion on the first pulsating DC voltage to thereby obtain a second pulsating DC voltage.

At operation 1030, convert, by a second-stage conversion circuit, the second pulsating DC voltage into a stable DC voltage.

At operation 1040, supply, by a valley-fill circuit, electrical power to increase a valley voltage of the first pulsating DC voltage, in response to a voltage value of the first pulsating DC being less than a first voltage threshold.

In the embodiments, the valley-fill circuit improves the valley voltage of the first pulsating DC voltage to enable the first pulsating DC voltage to have the sufficiently high valley voltage, which can provide sufficient power support for the subsequent conversion circuit and ensure the stability of the output voltage of the power supply device. In addition, the valley voltage of the first pulsating DC voltage is increased, which can reduce the peak current during subsequent voltage conversion, so that the size of the magnetic component in the subsequent circuit is reduced, thereby reducing the volume of the power supply device.

In some embodiments, the valley-fill circuit includes a first capacitor with a capacitance less than a capacitance threshold, The operation 1040 may include: discharge, by the first capacitor, electrical power to increase the valley voltage of the first pulsating DC voltage to the first voltage threshold, in response to the voltage value of the first pulsating DC voltage being less than the first voltage threshold.

In some embodiments, the first-stage conversion circuit includes a transformer including a primary winding and an auxiliary winding coupled to each other. The above method further include: perform rectification on an output voltage of the auxiliary winding to obtain a rectified output voltage, and charge the first capacitor with the rectified output voltage.

Figure 11:
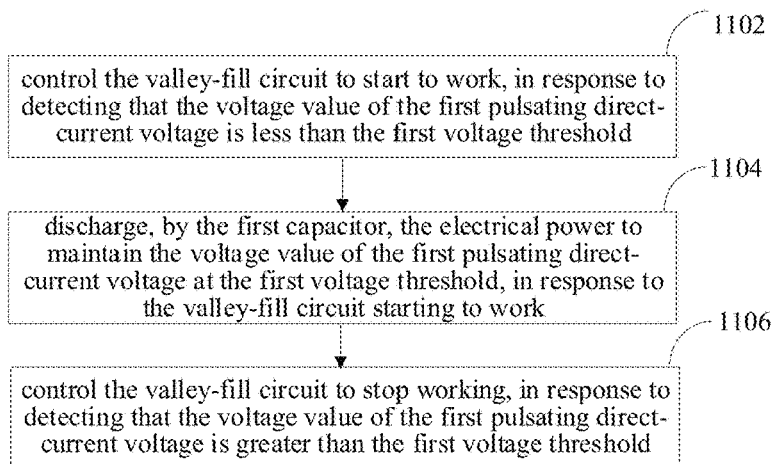
FIG. 11 is a schematic flowchart of controlling a valley-fill circuit to start to work and stop working according to an embodiment of the disclosure.

As illustrated in FIG. 11, the operation 1040 may include operations 1102 to 1106 in some embodiments.

At operation 1102, control the valley-fill circuit to start to work, in response to detecting that the voltage value of the first pulsating DC voltage is less than the first voltage threshold.

At operation 1104, discharge, by the first capacitor, electrical power to maintain the voltage value of the first pulsating DC voltage at the first voltage threshold, in response to the valley-fill circuit starting to work.

In some embodiments, the power supply device further includes a second capacitor, the valley-fill circuit includes a first switch module (also referred to as a first switch unit or a first switch circuit) and a first inductor, the first switch module is connected to the first capacitor, the first inductor is connected to the second capacitor and the first switch unit individually and configured to form a first-stage LC filter with the second capacitor.

The operation 1104 includes: perform, by the first switch module, chopper modulation on a voltage output by the first capacitor, in response to the valley-fill circuit starting to work; and filter, by the first-stage LC filter, the voltage that has been performed with the chopper modulation to obtain a stable voltage, in which the stable voltage is configured to maintain the voltage value of the first pulsating DC voltage at the first voltage threshold.

At operation 1106, control the valley-fill circuit to stop working, in response to detecting that the voltage value of the first pulsating DC voltage is greater than the first voltage threshold.

In the embodiments of the disclosure, the voltage value of the first pulsating DC voltage can be accurately detected, and the valley-fill circuit can be controlled to be enabled and disabled accurately, so that the valley voltage of the first pulsating DC voltage can be controlled accurately, and the stability of the output voltage of the power supply device 200 can be improved.

In some embodiments, the first-stage conversion circuit includes a second switch unit and a voltage transformation unit which are connected to each other. Operation 1020 includes: perform, by the second switch unit, chopper modulation on the first pulsating DC voltage; and perform, by the voltage transformation unit, the voltage-buck processing on the first pulsating DC voltage that has been performed with the chopper modulation to thereby obtain the second pulsating DC voltage.

In some embodiments, the first-stage conversion circuit further includes a second switch unit connected to a voltage transformation unit. The above charging method further include: control, in response to detecting that the voltage value of the first pulsating direct-current voltage is greater than a second voltage threshold, the second switch unit to switch to a half-bridge operating mode; control, in response to detecting that a voltage effective value of the first pulsating DC voltage is less than a third voltage threshold, the second switch unit to switch to a full-bridge operating mode.

In some embodiments, the second-stage conversion circuit include a DC-DC conversion circuit. In at least one alternative embodiment, the DC-DC conversion circuit includes a buck-boost circuit. The method further includes: control the buck-boost circuit to switch to a buck circuit mode, in response to detecting that a voltage value of the second pulsating DC voltage is greater than an output voltage of the buck-boost circuit; control the buck-boost circuit to switch to a boost circuit mode, in response to detecting that the voltage value of the second pulsating DC voltage is less than the output voltage of the buck-boost circuit.

It should be noted that, the description of the charging method provided by the embodiments of the disclosure may refer to the description of the power supply device in the above-mentioned embodiments, and details are not repeated here.

In the embodiment of the disclosure, a two-stage circuit structure is used to transform the rectified pulsating DC voltage to obtain the stable DC voltage, which can ensure that the DC voltage output by the power supply device is stable. In addition, after the valley voltage of the first pulsating DC voltage is increased, the valley voltage of the second pulsating DC voltage input to the second-stage conversion circuit is also increased, which may reduce the peak current of the second-stage conversion circuit, so that the size of the magnetic components in the second-stage conversion circuit is reduced, thereby reducing the volume of the power supply device.

The embodiments of the disclosure disclose a computer-readable storage medium, which stores a computer program. Specifically, the computer program is configured to be executed by a processor to implement the above method described in the above embodiments.

The embodiments of the disclosure disclose a computer program product, the computer program product includes a non-transitory computer-readable storage medium storing a computer program, and the computer program may be executed by a processor to implement the methods described in the foregoing embodiments.

Figure 12:
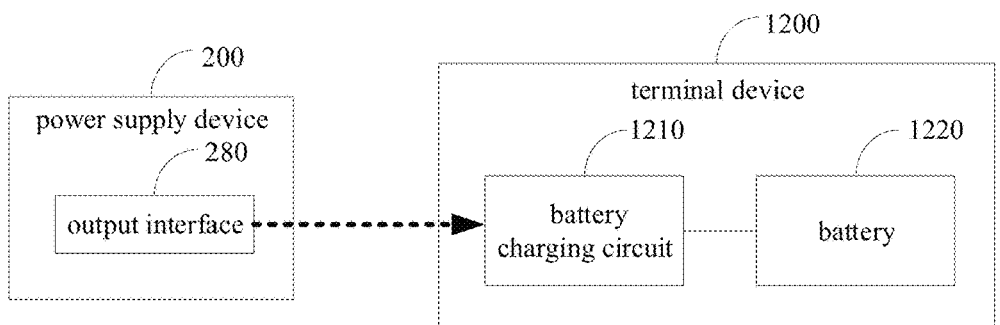
FIG. 12 is a schematic block diagram of a charging system according to an embodiment of the disclosure.

As illustrated in FIG. 12, a charging system is provided. The charging system may include the power supply device 200 and the terminal device 1200 as described in the above embodiments. The power supply device 200 may charge the terminal device 1200 in a charging manner which may be wired charging or wireless charging. Specifically, the power supply device 200 may further include an output interface 280, and the terminal device 1200 may include a battery charging circuit 1210 and a battery 1220.

A charging channel may be established between the power supply device 200 and the terminal device 1200, and a charging circuit may be formed between the power supply device 200 and the terminal device 1200. The output interface 280 may be connected with an output terminal of the second-stage conversion circuit 240 of the power supply device 200. After the charging channel is established between the power supply device 200 and the terminal device 1200, the output interface 280 may be configured to output a stable DC voltage to the terminal device 1200.

In some embodiments, the power supply device 200 may charge the terminal device 1200 in a direct charging manner, the DC voltage output by the power supply device 200 may be a DC voltage that meets the charging requirement of the terminal device 1200, and the DC voltage output by the power supply device 200 may be applied to the battery directly. The battery charging circuit 1210 of the terminal device 1200 may be configured to receive the stable DC voltage output from the output interface 280 and apply the stable DC voltage to the battery 1220. In at least one alternative embodiment, the battery charging circuit 1210 may include a component such as a switch to form a direct charging path.

In at least one alternative embodiment, a communication connection may also be established between the power supply device 200 and the terminal device 1200 to achieve the direct charging manner. The terminal device 1200 keeps communicating with the power supply device 200 in the direct charging process to form a closed-loop feedback mechanism. In this way, the power supply device 200 can be informed of a status of the battery 1220, so as to continuously adjust the output DC voltage to ensure that a magnitude of the charging voltage and/or the charging current provided by the power supply device 200 matches a voltage and/or a current currently required by the battery 1220.

In some embodiments, when the DC voltage output by the power supply device 200 does not meet the voltage required by the battery 1220 of the terminal device 1200, the battery charging circuit 1210 of the terminal device 1200 may convert the received DC voltage to obtain a voltage that meets the requirements of the battery 1220 and then apply such voltage to the battery 1220 to charge the battery 1220. In at least one alternative embodiment, the battery charging circuit 1210 may include components such as a charge pump, a switch device, a capacitor, but is not limited thereto.

Those of ordinary skill in the art may understand that all or some of procedures of the methods in the foregoing embodiments may be implemented by a computer program instructing relevant hardware. The program may be stored in a non-volatile computer-readable storage medium. When the program is executed, the procedures of the foregoing method embodiments may be included. The storage medium may be a magnetic disk, an optical disk, a read-only memory (ROM), or the like.

Any reference to a memory, a storage, a database, or another medium used in the embodiments provided in this disclosure may include a non-volatile and/or volatile memory. The suitable non-volatile memory may include a read-only memory (ROM), a programmable ROM (PROM), an erasable prom (EPROM), an electrically erasable prom (EEPROM) or a flash memory. The volatile memory may include a random access memory (RAM) used as an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchronous link (Synchlink) DRAM (SLDRAM), a RAM bus (Rambus) direct RAM (RDRAM), and a direct Rambus dynamic RAM (DRDRAM).

It should be understood that reference throughout the disclosure to "one embodiment" or "an embodiment" means that a particular feature, structure or characteristic associated with the embodiment is included in at least one embodiment of the disclosure. Therefore, "in one embodiment" or "in an embodiment" throughout the specification does not necessarily refer to the same embodiment. In addition, these particular feature, structure, or characteristics may be combined in one or more embodiments in any suitable manner. It is well known to those skilled in the art that the embodiments described in the disclosure are all alternative embodiments, and the involved action and module are not necessarily required by the disclosure.

It should be understood that, in various embodiments of the disclosure, sequence numbers of the foregoing processes do not imply inevitable execution sequences. The execution sequences of the processes should be determined according to functions and internal logic of the processes, and the sequence numbers should not be construed as any limitation on the implementation processes of the embodiments of the disclosure.

The units described as separated parts may or may not be physically separated, and components displayed as units may or may not be physical units, and may be located in one position or be distributed on a plurality of network units. Some or all of the units may be selected according to actual requirements to achieve the objectives of the solutions of the embodiments.

In addition, the various functional units in the various embodiment of the disclosure may be integrated into one processing unit, or each unit may exist physically alone, or two or more units may be integrated into one unit. The above-mentioned integrated units may be implemented in a form of hardware, or may be implemented in a form of software functional units.

When the integrated unit is implemented in the form of a software functional unit and sold or used as an independent product, the integrated unit may be stored in a computer-accessible storage. Based on such an understanding, the technical solutions of the disclosure essentially, or the part contributing to other approaches, or all or some of the technical solutions may be implemented in a form of a software product. The computer software product is stored in a memory and includes several requests for instructing a computer device (which may be a personal computer, a server, a network device, or the like, and may be further a processor in a computer device) to perform all or some of the operations of the foregoing methods described in the embodiments of this disclosure.

The power supply device, the charging method and system, and the computer-readable storage medium disclosed in the embodiments of the disclosure have been described above in detail. The principles and implementations of the disclosure are described with specific examples, and the descriptions of the foregoing embodiments are merely intended to help understand the method of the disclosure and the core ideas thereof. In addition, a person of ordinary skill in the art may make variations and modifications to the disclosure in terms of the specific implementations and application scopes based on the ideas of the disclosure. Therefore, the contents of the disclosure shall not be construed as a limitation to the disclosure.

What is claimed is:

1. A power supply device, comprising:
a rectifier circuit configured to perform rectification on alternating-current power to thereby obtain a first pulsating direct-current voltage;
a first-stage conversion circuit connected to the rectifier circuit, wherein the first-stage conversion circuit is configured to perform isolation conversion on the first pulsating direct-current voltage to thereby obtain a second pulsating direct-current voltage;
a second-stage conversion circuit connected to the first-stage conversion circuit, wherein the second-stage conversion circuit is configured to convert the second pulsating direct-current voltage into a stable direct-current voltage; and
a valley-fill circuit connected to the rectifier circuit and the first-stage conversion circuit individually, wherein the valley-fill circuit is configured to supply, in response to a voltage value of the first pulsating direct-current being less than a first voltage threshold, electrical power to an input of the first-stage conversion circuit to thereby increase a valley voltage of the first pulsating direct-current voltage.

2. The power supply device as claimed in claim 1, wherein the valley-fill circuit comprises a first capacitor, and the first capacitor is configured to supply, in response to the voltage value of the first pulsating direct-current voltage being less than the first voltage threshold, the electrical power to the input of the first-stage conversion circuit to thereby increase the valley voltage of the first pulsating direct-current voltage to the first voltage threshold.

3. The power supply device as claimed in claim 2, wherein the first-stage conversion circuit comprises a transformer including a primary winding and an auxiliary winding coupled to each other; and the valley-fill circuit further comprises a first diode connected to the auxiliary winding and the first capacitor individually;
the auxiliary winding is configured to output a voltage according to a generated induced electromotive force; and the first diode is configured to perform rectification on an output voltage of the auxiliary winding to obtain a rectified output voltage and charge the first capacitor with the rectified output voltage.

4. The power supply device as claimed in claim 2, further comprising:
a detection circuit connected to an input terminal of the first-stage conversion circuit, wherein the detection circuit is configured to detect the voltage value of the first pulsating direct-current voltage input to the first-stage conversion circuit; and
a control circuit connected to the detection circuit and the valley-fill circuit individually, wherein the control circuit is configured to control the valley-fill circuit to start to work, in response to the voltage value of the first pulsating direct-current voltage detected by the detection circuit being less than the first voltage threshold;
wherein the control circuit is further configured to control the valley-fill circuit to stop working, in response to the voltage value of the first pulsating direct-current voltage detected by the detection circuit being greater than the first voltage threshold.

5. The power supply device as claimed in claim 4, wherein the valley-fill circuit further comprises a first switch circuit connected to the control circuit and the first capacitor individually;
the first switch circuit is configured to switch on and off states in a high-frequency manner according to a control signal output by the control circuit to thereby perform a chopper modulation on a voltage output by the first capacitor, when the valley-fill circuit starts to work; and
the first switch circuit is further configured to be in the off state when the valley-fill circuit stops working.

6. The power supply device as claimed in claim 5, wherein the rectifier circuit comprises a second capacitor configured to filter a rectified alternating-current power to thereby obtain the first pulsating direct-current voltage; and
wherein the valley-fill circuit comprises a first inductor and a second diode, a terminal of the first inductor is connected to a terminal of the second capacitor, another terminal of the first inductor is connected to a negative terminal of the second diode and a terminal of the first switch circuit, another terminal of the first switch circuit is connected to a negative terminal of the first diode and a terminal of the first capacitor, and another terminal of the first capacitor is connected to a positive terminal of the second diode, another terminal of the second capacitor, and the auxiliary winding.

7. The power supply device as claimed in claim 2, wherein the rectifier circuit comprises a second capacitor with a capacitance less than a capacitance threshold, and the second capacitor is configured to filter a rectified alternating-current power to thereby obtain the first pulsating direct-current voltage.

8. The power supply device as claimed in claim 7, wherein the valley-fill circuit further comprises a first inductor connected to the second capacitor, and the first inductor is configured to form a first-stage inductance-capacitance (LC) filter with the second capacitor.

9. The power supply device as claimed in claim 1, wherein the first voltage threshold is an output voltage of the valley-fill circuit.

10. The power supply device as claimed in claim 1, wherein the first-stage conversion circuit comprises a second switch circuit and a voltage transformation circuit, the second switch circuit is connected to the voltage transformation circuit and the rectifier circuit individually;
the second switch circuit is configured to perform chopper modulation on the first pulsating direct-current voltage; and
the voltage transformation circuit is configured to perform voltage-buck processing on the first pulsating direct-current voltage that has been performed with the chopper modulation to thereby obtain the second pulsating direct-current voltage.

11. The power supply device as claimed in claim 10, further comprising:
a detection circuit connected to an input terminal of the first-stage conversion circuit, wherein the detection circuit is configured to detect the voltage value of the first pulsating direct-current voltage input to the first-stage conversion circuit; and
a control circuit connected to the detection circuit and the second switch circuit individually, wherein the control circuit is configured to control, in response to the voltage value of the first pulsating direct-current voltage detected by the detection circuit being greater than a second voltage threshold, the second switch circuit to switch to a half-bridge operating mode;
wherein the control circuit is further configured to control, in response to a voltage effective value of the first pulsating direct-current voltage detected by the detection circuit being less than a third voltage threshold, the second switch circuit to switch to a full-bridge operating mode.

12. The power supply device as claimed in claim 1, wherein the first-stage conversion circuit comprises a direct-current voltage transformation circuit, and the second-stage conversion circuit comprises a buck-boost circuit.

13. A charging method, applied in a power supply device, the method comprising:
performing, by a rectifier circuit, rectification on a received alternating-current voltage to obtain a first pulsating direct-current voltage;
performing, by a first-stage conversion circuit, isolation conversion on the first pulsating direct-current voltage to thereby obtain a second pulsating direct-current voltage;
converting, by a second-stage conversion circuit, the second pulsating direct-current voltage into a stable direct-current voltage; and
supplying, by a valley-fill circuit, electrical power to increase a valley voltage of the first pulsating direct-current voltage, in response to a voltage value of the first pulsating direct-current being less than a first voltage threshold.

14. The charging method as claimed in claim 13, wherein the valley-fill circuit comprises a first capacitor with a capacitance less than a capacitance threshold;
wherein supplying, by the valley-fill circuit, electrical power to increase the valley voltage of the first pulsating direct-current voltage, in response to the voltage value of the first pulsating direct-current being less than the first voltage threshold, comprises:
discharging, by the first capacitor, electrical power to increase the valley voltage of the first pulsating direct-current voltage to the first voltage threshold, in response to the voltage value of the first pulsating direct-current voltage being less than the first voltage threshold.

15. The charging method as claimed in claim 14, wherein the first-stage conversion circuit comprises a transformer including a primary winding and an auxiliary winding coupled to each other; and the charging method further comprises:
performing rectification on an output voltage of the auxiliary winding to obtain a rectified output voltage and charging the first capacitor with the rectified output voltage.

16. The charging method as claimed in claim 14, wherein discharging, by the first capacitor, electrical power to increase the valley voltage of the first pulsating direct-current voltage to the first voltage threshold, in response to the voltage value of the first pulsating direct-current voltage being less than the first voltage threshold, comprises:

controlling the valley-fill circuit to start to work, in response to detecting that the voltage value of the first pulsating direct-current voltage is less than the first voltage threshold;

discharging, by the first capacitor, the electrical power to maintain the voltage value of the first pulsating direct-current voltage at the first voltage threshold, in response to the valley-fill circuit starting to work; and controlling the valley-fill circuit to stop working, in response to detecting that the voltage value of the first pulsating direct-current voltage is greater than the first voltage threshold.

17. The charging method as claimed in claim 16, wherein the power supply device further comprises a second capacitor, the valley-fill circuit comprises a first switch circuit and a first inductor, the first switch circuit is connected to the first capacitor, the first inductor is connected to the second capacitor and the first switch circuit individually and configured to form a first-stage LC filter with the second capacitor; and wherein discharging, by the first capacitor, the electrical power to maintain the voltage value of the first pulsating direct-current voltage at the first voltage threshold, in response to the valley-fill circuit starting to work, comprises:

performing, by the first switch circuit, chopper modulation on a voltage output by the first capacitor, in response to the valley-fill circuit starting to work; and filtering, by the first-stage LC filter, the voltage that has been performed with the chopper modulation to obtain a stable voltage, wherein the stable voltage is configured to maintain the voltage value of the first pulsating direct-current voltage at the first voltage threshold.

18. The charging method as claimed in claim 13, wherein the first-stage conversion circuit comprises a voltage transformation circuit and a second switch circuit, the second switch circuit is connected to the voltage transformation circuit, and the performing, by a first-stage conversion circuit, isolation conversion on the first pulsating direct-current voltage to thereby obtain a second pulsating direct-current voltage, comprises:

performing, by the second switch circuit, chopper modulation on the first pulsating direct-current voltage; and performing, by the voltage transformation circuit, voltage-buck processing on the first pulsating direct-current voltage that has been performed with the chopper modulation to thereby obtain the second pulsating direct-current voltage.

19. The charging method as claimed in claim 18, further comprising:

controlling, in response to detecting that the voltage value of the first pulsating direct-current voltage is greater than a second voltage threshold, the second switch circuit to switch to a half-bridge operating mode; and controlling, in response to detecting that a voltage effective value of the first pulsating direct-current voltage is less than a third voltage threshold, the second switch circuit to switch to a full-bridge operating mode.

20. A charging system, comprising a power supply device and a terminal device;

wherein the power supply device comprises:
a rectifier circuit configured to perform rectification on alternating-current power to thereby obtain a first pulsating direct-current voltage;

a first-stage conversion circuit connected to the rectifier circuit, wherein the first-stage conversion circuit configured to perform voltage-buck processing on the first pulsating direct-current voltage to thereby obtain a second pulsating direct-current voltage;

a second-stage conversion circuit connected to the first-stage conversion circuit, wherein the second-stage conversion circuit is configured to convert the second pulsating direct-current voltage into a stable direct-current voltage;

a valley-fill circuit, wherein an input of the first-stage circuit is connected to an output of the valley-fill circuit and an output of the rectifier circuit, and the valley-fill circuit is configured to receive an input voltage from the first-stage conversion circuit and supply electrical power to the input of the first-stage conversion circuit to thereby increase a valley voltage of the first pulsating direct-current voltage, in response to a voltage value of the first pulsating direct-current being less than a first voltage threshold; and an output interface connected to an output terminal of the second-stage conversion circuit of the power supply device;

wherein the terminal device comprises a battery charging circuit, and the battery charging circuit is configured to receive the stable direct-current voltage output by the output interface and apply the stable direct-current voltage to a battery.

* * * * *